United States Patent
Nozaki et al.

(12)

(10) Patent No.: US 10,391,888 B2
(45) Date of Patent: Aug. 27, 2019

(54) SEAT DEVICE

(71) Applicant: TACHI-S CO., LTD., Tokyo (JP)

(72) Inventors: Hiroyuki Nozaki, Tokyo (JP); Yohei Ota, Tokyo (JP); Norito Akimoto, Tokyo (JP); Masaaki Honda, Tokyo (JP)

(73) Assignee: TACHI-S CO., LTD., Akishima-shi (JP)

( * ) Notice: Subject to any disclaimer, the term of this patent is extended or adjusted under 35 U.S.C. 154(b) by 0 days.

(21) Appl. No.: 15/743,035

(22) PCT Filed: Feb. 22, 2016

(86) PCT No.: PCT/JP2016/055020
§ 371 (c)(1),
(2) Date: Jan. 9, 2018

(87) PCT Pub. No.: WO2017/013890
PCT Pub. Date: Jan. 26, 2017

(65) Prior Publication Data
US 2019/0070979 A1    Mar. 7, 2019

(30) Foreign Application Priority Data

Jul. 23, 2015  (JP) .................................. 2015-146152

(51) Int. Cl.
*B60N 2/06* (2006.01)
*B60N 2/02* (2006.01)
(Continued)

(52) U.S. Cl.
CPC ......... *B60N 2/0232* (2013.01); *B60N 2/0248* (2013.01); *B60N 2/06* (2013.01);
(Continued)

(58) Field of Classification Search
CPC combination set(s) only.
See application file for complete search history.

(56) References Cited

U.S. PATENT DOCUMENTS

| 6,170,865 B1 * | 1/2001 | Barron | B60N 2/0276 |
| | | | 280/735 |
| 2004/0159764 A1 * | 8/2004 | Oshima | B60N 2/0232 |
| | | | 248/429 |

(Continued)

FOREIGN PATENT DOCUMENTS

| JP | 1-175437 U | 12/1989 |
| JP | 2004-210084 A | 7/2004 |

(Continued)

OTHER PUBLICATIONS

International Search Report dated May 24, 2016, issued in counterpart International Application No. PCT/JP2016/055020 (2 pages).

(Continued)

*Primary Examiner* — Masud Ahmed
(74) *Attorney, Agent, or Firm* — Westerman, Hattori, Daniels & Adrian, LLP

(57) ABSTRACT

A seat moves along a rail in the front-back direction of a vehicle. A juxtaposed member (receiving member) extending in the front-back direction of the vehicle is joined to a floor or the seat so as to be located next to the rail. A detected portion is provided either to the juxtaposed member or to a member which is located on the floor side or the seat side which moves relative to the floor or the seat to which the juxtaposed member is coupled. A sensor that detects the detected portion is provided either to the juxtaposed member or to the member located on the floor side or the seat side. As a result of this configuration, the installation position of the sensor is less spatially restricted than the case in which the sensor is provided to the rail.

9 Claims, 3 Drawing Sheets

(51) Int. Cl.
 *B60N 2/90* (2018.01)
 *B60R 16/027* (2006.01)
(52) U.S. Cl.
 CPC .............. *B60N 2/90* (2018.02); *B60N 2/067* (2013.01); *B60N 2002/0264* (2013.01); *B60R 16/027* (2013.01)

(56) References Cited

U.S. PATENT DOCUMENTS

| | | | | |
|---|---|---|---|---|
| 2004/0256894 | A1* | 12/2004 | McMarnus | B60N 2/06 297/93 |
| 2009/0072595 | A1* | 3/2009 | Tsuda | B60N 2/3047 297/188.1 |
| 2012/0318072 | A1* | 12/2012 | Endo | B60N 2/002 73/862.381 |
| 2017/0327013 | A1* | 11/2017 | Nozaki | A47C 7/54 |
| 2018/0345824 | A1* | 12/2018 | Akimoto | B60N 2/06 |

FOREIGN PATENT DOCUMENTS

| | | | |
|---|---|---|---|
| JP | 2004-309245 | A | 11/2004 |
| JP | 2005-162024 | A | 6/2005 |
| JP | 3112336 | U | 8/2005 |

OTHER PUBLICATIONS

Notification Concerning Transmittal of International Preliminary Report on Patentability (Form PCT/IB/326) issued in counterpart International Application No. PCT/JP2016/055020 dated Feb. 1, 2018, with Forms PCT/IB/373, PCT/IB/338 and PCT/ISA/237. (13 pages).

\* cited by examiner

SEAT DEVICE

TECHNICAL FIELD

The present invention relates to a seat device, especially relates to a seat device configured to detect a position of a seat.

BACKGROUND ART

There has been a seat device that includes a seat movable along a rail fixed to a floor of a vehicle such as an automobile, and a lock mechanism disposed to fasten the seat at any position on the rail. In this type of technique, there has been a seat device where an element that generates a signal is installed on the rail while a detector for detecting the signal is installed on the seat, so as to detect the position of the seat on the rail (Patent Literature 1).

CITATION LIST

Patent Literature

PTL 1: Japanese Registered Utility Model No. 3112336

SUMMARY OF INVENTION

Technical Problem

However, in the above conventional technique, the rail is required to be downsized and reduce weight while ensuring strength for supporting the seat, and in addition, the lock mechanism is disposed, thus there is a problem where installation positions of the element and the detector (what is called a sensor) are spatially restricted.

The present invention has been made to address the above-described problem, and it is an object of the present invention to provide a seat device configured to improve a degree of freedom of an installation position of a sensor.

Solution to Problem and Advantageous Effects of Invention

To achieve this object, according to a seat device described in a first aspect, a rail is disposed on a floor of a vehicle, the rail extends along a front-back direction of the vehicle, and seat is movable in the front-back direction of the vehicle along the rail. A lock portion fastens the seat unmovably to the rail, and a juxtaposed member is coupled to the floor or the seat, side by side with the rail, the juxtaposed member extends along the front-back direction of the vehicle. A detected portion is disposed on a member or the juxtaposed member, the member relatively moves with respect to the floor or the seat to which the juxtaposed member is coupled, the member is on a side of the floor or a side of the seat. A sensor that detects the detected portion is disposed on any of the juxtaposed member and the member on the floor side or the seat side, thus an installation position of the sensor is spatially less restricted compared with a case where the sensor is disposed on the rail. Accordingly, an efficiency to improve a degree of freedom of the installation position of the sensor is provided.

According to the seat device described in a second aspect, a plurality of the rails are disposed on both sides in a right-left direction of the seat at intervals to one another in a right-left direction of the vehicle. The juxtaposed member is disposed between the plurality of the rails, thus, in addition to the effects of the first aspect, an effect to ensure a space for disposing the juxtaposed member under the seat movable along the rail in the front-back direction of the vehicle is provided.

According to the seat device described in a third aspect, a power feeding member includes a receiving member, a power feeding wire, and a supporting portion. The power feeding wire that supplies electric power to an electric component equipped in the seat has a first end coupled to a wire on the floor side. The receiving member is disposed on the floor, the receiving member extends along the front-back direction of the vehicle, and the receiving member includes the power feeding wire. A supporting portion fixes a second end side of the power feeding wire, and is movable along the receiving member. The supporting portion is coupled to the seat, and the juxtaposed member doubles as the receiving member. The detected portion is disposed on one of the supporting portion and the receiving member, and the sensor is disposed on the other of the supporting portion and the receiving member, thus ensuring use of the power feeding member as a mechanism detecting the position of the seat. The rail and the power feeding member are installed on the floor of the vehicle, and the seat device is assembled by coupling the supporting portion of the power feeding member with the seat, thus, in addition to the effects of the first aspect or the second aspect, efficiently improving the assembly operability of the seat device.

According to the seat device described in a fourth aspect, the detected portion is disposed on the receiving member, thus ensuring disposing the detected portion on any position of the receiving member. The sensor is disposed on the supporting portion, thus, in addition to the effects of the third aspect, an effect to detect the detected portion disposed on the receiving member so as to detect the position of the supporting portion (the position of the seat) is provided.

DESCRIPTION OF EMBODIMENTS

Figure 1:
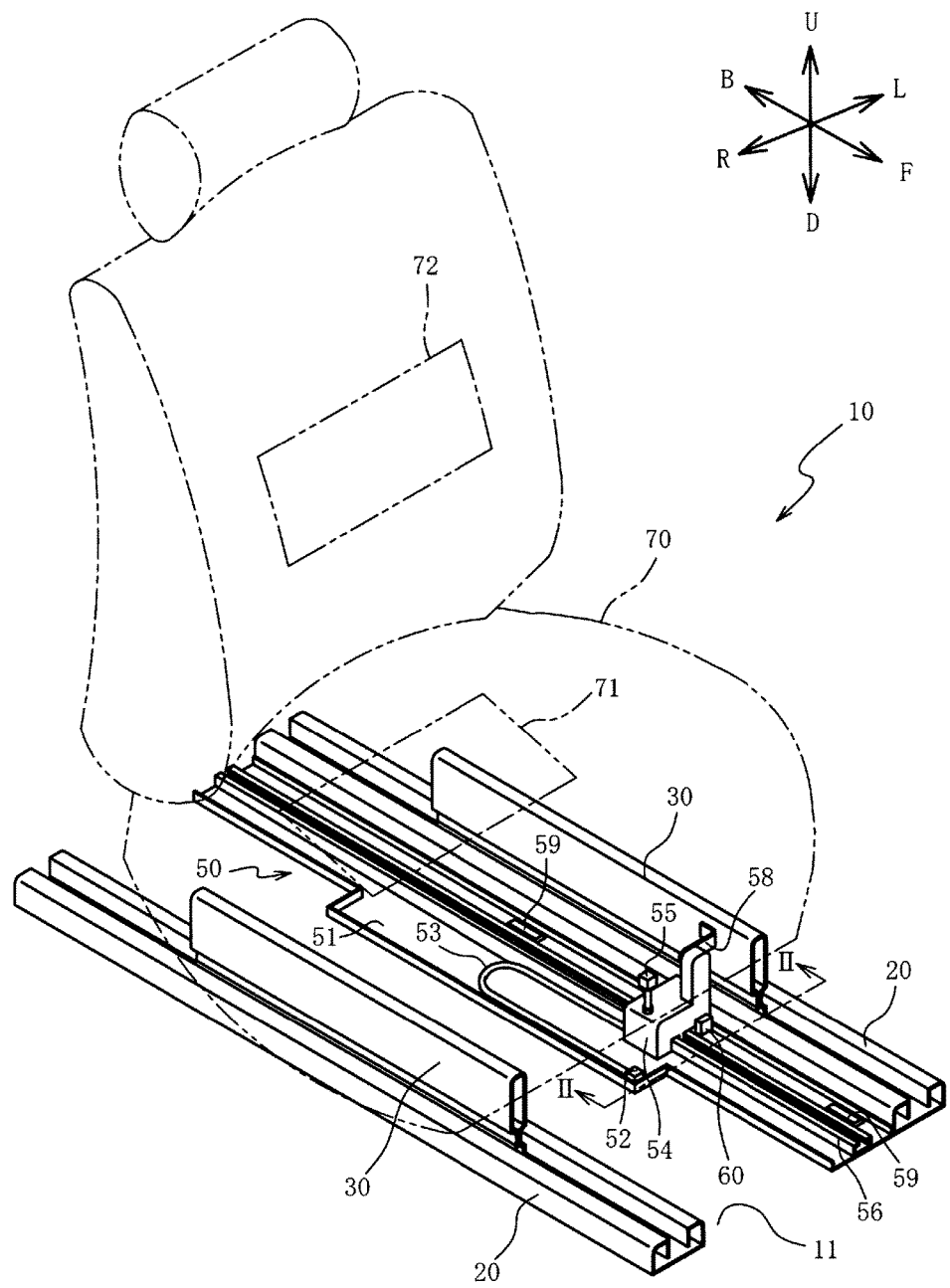
FIG. 1 is a perspective view of a seat device in one embodiment of the present invention.

The following describes a preferable embodiment of the present invention with reference to attached drawings. A description will be given of a schematic configuration of a seat device 10 with reference to FIG. 1. FIG. 1 is a perspective view of the seat device 10 in one embodiment of the present invention. An arrow F, an arrow B, an arrow L, an arrow R, an arrow U, and an arrow D illustrated in FIG. 1 to FIG. 3 mean forward, backward, leftward, rightward, upward, and downward of a vehicle. For ease of understanding, FIG. 1 is simplified such that illustrations of an insertion hole 36 formed on a sliding portion 30 and a lock lever 40 inserted through the insertion hole 36 are omitted.

As illustrated in FIG. 1, the seat device 10 is a device installed on a floor 11 of a vehicle, and includes a pair of right and left rails 20 arranged on the floor 11, a power feeding member 50 arranged on the floor 11 alongside of the rails 20, and a seat 70 movable in a front-back direction along the rail 20. In this embodiment, the seat device 10 for a front passenger seat is illustrated. The rail 20 is a member extending in the front-back direction of the vehicle, and includes the sliding portion 30 that supports the seat 70. In the seat 70, a pressure sensor 71 that detects an existence of an occupant seated on the seat 70 and a heater 72 for warming the occupant are disposed. The pressure sensor 71 and the heater 72 are electric components equipped in the seat 70.

The power feeding member 50 is a member for supplying electric power to the electric components in the seat 70, and includes a receiving member 51 arranged between the rails 20 disposed on the floor 11, a power feeding wire 53 coupled to a wire (not illustrated) laid on the floor 11, and a supporting portion 54 movable in the front-back direction along the receiving member 51. Since the supporting portion 54 is coupled to the sliding portion 30 via a coupling portion 58, the supporting portion 54 is guided by a lower rail 56 disposed on the receiving member 51 parallel to the rail 20 so as to be movable in the front-back direction along with the seat 70 and the sliding portion 30.

The power feeding wire 53 has a first end coupled to a terminal 52 while a second end is coupled to a terminal 55. The terminal 52 is a member to which the wire (not illustrated) laid on the floor 11 is coupled, and fixed to the receiving member 51. The terminal 55 is a member to which a wire (not illustrated) coupled to the electric components (the pressure sensor 71, the heater 72) in the seat 70 is coupled. In the power feeding wire 53, a second end side coupled to the terminal 55 is fixed to the supporting portion 54. The power feeding wire 53 has a part from the first end coupled to the terminal 52 to the supporting portion 54 lying on the receiving member 51 in a state of being bent. The power feeding wire 53 is configured to have a length from the terminal 52 to the supporting portion 54 to be a little longer than a moving distance of the supporting portion 54 on the receiving member 51, thus preventing the power feeding wire 53 from disturbing the move of the supporting portion 54.

The receiving member 51 is a plate-shaped member (a juxtaposed member) arranged side by side with the rail 20, and includes detected portions 59 on predetermined positions in a longitudinal direction (the front-back direction). In the power feeding member 50, a sensor 60 for detecting the detected portions 59 is disposed on the supporting portion 54. In this embodiment, the detected portions 59 are disposed on positions detected by the sensor 60, installed on the supporting portion 54, when the seat 70 moves to most forward and backward positions in a range of motion of the seat 70.

Figure 2:
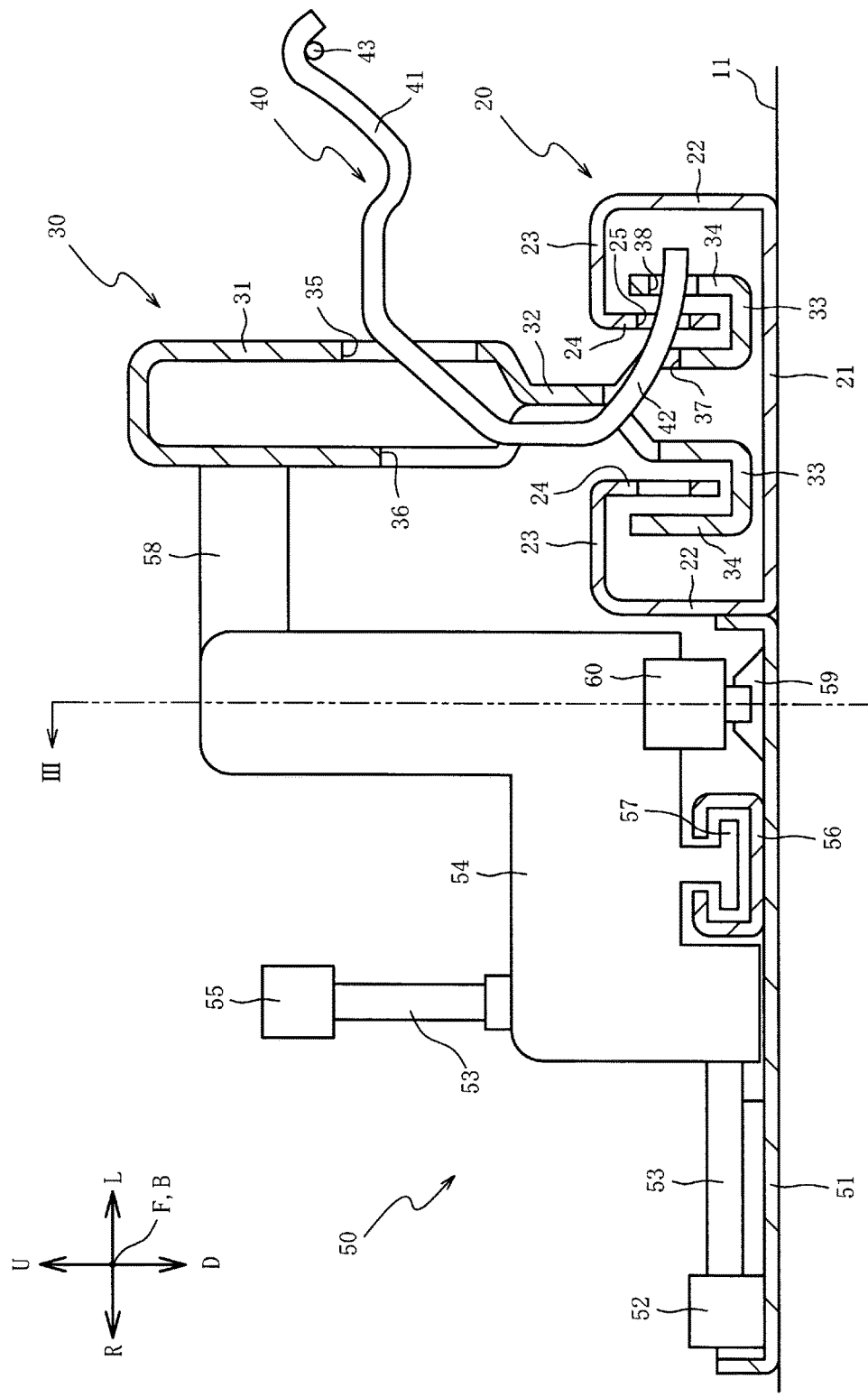
FIG. 2 is a cross-sectional view of the seat device taken along the line II-II in FIG. 1.

A description will be given of the rail 20, the sliding portion 30, and the power feeding member 50 with reference to FIG. 2. FIG. 2 is a cross-sectional view of the seat device 10 taken along the line II-II in FIG. 1. As illustrated in FIG. 2, the rail 20 includes a bottom portion 21 contacting the floor 11, sidewalls 22 extending upward from both right and left sides of the bottom portion 21, protruding portions 23 extending from upper edges of the sidewalls 22 in directions approaching one another, and folded portions 24 extending downward from edges on inner sides of the respective protruding portions 23. The bottom portion 21, the sidewall 22, the protruding portion 23, and the folded portion 24 are continuously formed in the front-back direction of the vehicle (a vertical direction to a paper surface of FIG. 2). The folded portion 24 includes a rectangular-shaped lock hole 25 passing through in a thickness direction. A plurality of the lock holes 25 are disposed side by side at intervals to one another in the longitudinal direction of the folded portion 24 (the front-back direction of the vehicle).

The sliding portion 30 includes a wall portion 31 having a rectangular cross-section, an extending portion 32 split into two from a bottom of the wall portion 31 to each extend obliquely downward, protruding portions 33 extending from the extending portion 32 toward both right and left sides, and folded portions 34 extending upward from both right and left sides of the protruding portion 33. The extending portion 32 is positioned between the right and left folded portions 24, the protruding portion 33 is positioned between the bottom portion 21 and the folded portion 24 of the rail 20, and the folded portion 34 is positioned between the sidewall 22 and the folded portion 24 of the rail 20. The wall portion 31, the extending portion 32, the protruding portion 33, and the folded portion 34 are continuously formed in the front-back direction of the vehicle (the vertical direction to the paper surface of FIG. 2). In the sliding portion 30, a bearing (not illustrated) is fixedly secured to an outer surface of the folded portion 34, and the bearing (not illustrated) rolls on the bottom portion 21 so as to slidably support the sliding portion 30 to the rail 20 in the longitudinal direction (the front-back direction).

The sliding portion 30 includes insertion holes 35, 36, and 37 from the wall portion 31 to the extending portion 32, and the folded portion 34, which the insertion hole 37 of the extending portion 32 overlaps in a right-left direction, includes a rectangular-shaped lock hole 38 passing through in a thickness direction. A plurality of the lock holes 38 are disposed side by side at intervals to one another in the longitudinal direction of the folded portion 34 (the front-back direction of the vehicle). The lock holes 38 are positioned in the right-left direction of the lock holes 25, and the intervals of the lock holes 38 are configured to be identical to the intervals of the lock holes 25.

The lock lever 40 is a bent member inserted through the insertion holes 35, 36, and 37, and coupled to the sliding portion 30 rotatable around a rotation axis (not illustrated) along the longitudinal direction (the vertical direction to the paper surface of FIG. 2). The lock lever 40 includes a lever 41 operated by the occupant and a claw portion 42 coupled to a lower end of the lever 41 and folded back facing an outside in the right-left direction. The claw portion 42 is a portion inserted into the lock holes 25 and 38, and a plurality of the claw portions 42 are disposed side by side at intervals identical to the intervals of the lock holes 25 and 38. The lock lever 40 is biased by a spring 43 in the inserting direction of the claw portion 42 into the lock holes 25 and 38 around the rotation axis (not illustrated).

Moving down the lever 41 against the biasing force by the spring 43 causes the claw portion 42 to exit from the lock holes 25 and 38. This allows the sliding portion 30 to move with respect to the rail 20. Inserting the claw portion 42 of the lock lever 40 into the lock holes 25 and 38 restricts the move of the sliding portion 30 with respect to the rail 20, so as to position the seat 70 supported to the sliding portion 30.

The supporting portion 54 has a lower surface on which an upper rail 57 that engages with the lower rail 56 disposed on the receiving member 51 is disposed. The lower rail 56 and the upper rail 57 are continuously formed in the front-back direction of the vehicle (the vertical direction to the paper surface of FIG. 2). The supporting portion 54 coupled to the sliding portion 30 via the coupling portion 58 is guided in the front-back direction along the lower rail 56 by the engagement of the upper rail 57 with the lower rail 56. The supporting portion 54 includes the sensor 60 installed on a front surface, and the detected portions 59 detected by the sensor 60 are disposed on the receiving member 51. In this embodiment, the sensor 60 is a limit switch that includes a switch including a contact mechanism configured to perform an open and close operation by specified operation and force, and a head portion that transmits a force and a motion from outside to the switch.

Figure 3:
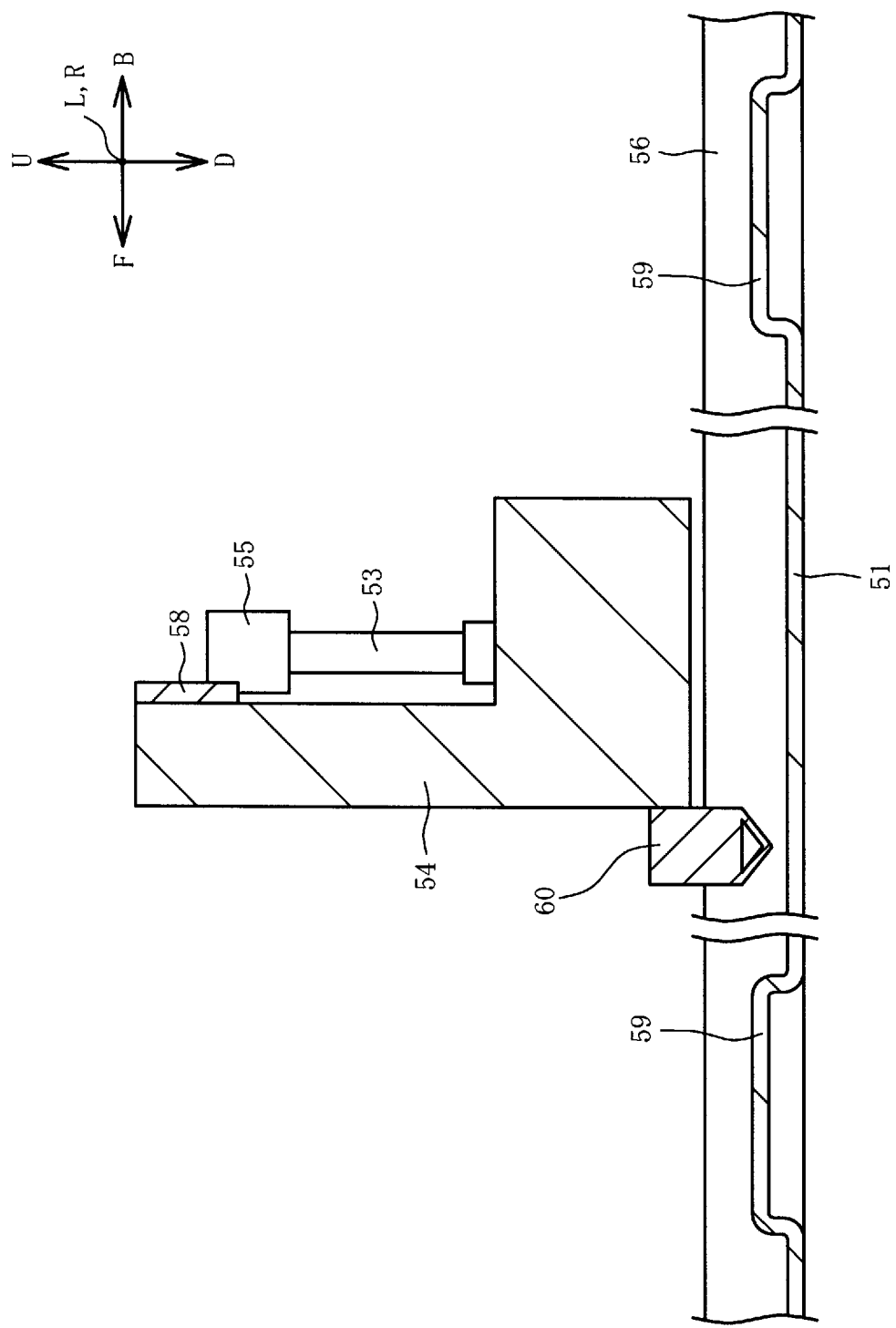
FIG. 3 is a cross-sectional view of the seat device taken along the line in FIG. 2.

A description will be given of a relation between the detected portion 59 and the sensor 60 with reference to FIG. 3. FIG. 3 is a cross-sectional view of the seat device 10 taken along the line in FIG. 2. In FIG. 3, an illustration of a part of the receiving member 51 in the longitudinal direction is omitted.

As illustrated in FIG. 3, the receiving member 51 includes the detected portions 59 projecting upward from the lower surface side. Since the receiving member 51 is formed in a plate shape, a presswork and similar work are used to easily form the detected portion 59 on any position. A height of the detected portion 59 projecting from the receiving member 51 is configured to be a height necessary for opening and closing the switch included in the sensor 60 installed on the supporting portion 54 in a relation with an installation height of the sensor 60 to the supporting portion 54.

With the move of the supporting portion 54, when the sensor 60 reaches the position of the detected portion 59, the switch of the sensor 60 is turned on, and when the sensor 60 leaves the position of the detected portion 59, the switch of the sensor 60 is turned off. This detects the position of the supporting portion 54 with respect to the receiving member 51, that is, the position of the seat 70 with respect to the rail 20. Employing the limit switch having excellent mechanical strength and environment resistance for the sensor 60 ensures durability.

The sensor 60 installed on the end surface of the supporting portion 54 in the front-back direction ensures free setting of a size of the sensor 60 and similar setting and easy installation of the sensor 60 compared with a case where the sensor 60 is installed on a lower surface (a space between the supporting portion 54 and the receiving member 51) of the supporting portion 54. This improves a degree of freedom of choice of the sensor 60, and improves workability on the installation of the sensor 60 to the supporting portion 54.

According to the seat device 10, the sensor 60 that detects the detected portion 59 formed on the receiving member 51 (the juxtaposed member) is disposed on the supporting portion 54 (the member on the seat 70 side) that integrally moves with the seat 70. Consequently, the installation position of the sensor 60 is spatially less restricted compared with the case where the sensor 60 is disposed on the rail 20. Accordingly, the degree of freedom of the installation position of the sensor 60 is improved.

The receiving member 51 (the juxtaposed member) arranged between the pair of the rails 20 ensures the space for disposing the receiving member 51 under the seat 70 movable along the rail 20 in the front-back direction of the vehicle. Accordingly, empty spaces between the rails 20 and under the seat 70 are effectively utilized to install a mechanism detecting the position of the seat 70.

The supporting portion 54 is coupled to the seat 70, and the receiving member 51 doubles as the juxtaposed member. The detected portion 59 disposed on the receiving member 51 and the sensor 60 disposed on the supporting portion 54 ensure the power feeding member 50 to be used as a mechanism detecting the position of the seat 70. The power feeding member 50 to which the mechanism detecting the position of the seat 70 is added and the rail 20 are installed on the floor 11 of the vehicle, and the seat device 10 is assembled by coupling the supporting portion 54 of the power feeding member 50 with the seat 70, thus the assembly operability of the seat device 10 ensures being improved.

The detected portion 59 disposed on the receiving member 51 ensure disposing the detected portion 59 on any position of the receiving member 51 in the longitudinal direction. The sensor 60 disposed on the supporting portion 54 ensures detecting the detected portion 59 disposed on the receiving member 51, so as to detect the position of the supporting portion 54 (the position of the seat 70). When the detected portion is disposed on the supporting portion 54, and the sensor is disposed on the receiving member 51, a plurality of the sensors 60 that detect the detected portion moving with the supporting portion 54 (the seat 70) are necessary to be disposed on the receiving member 51. However, the sensor 60 disposed on the supporting portion 54 (the member on the seat 70 side) reduces the number of the sensors 60.

As described above, the present invention has been described based on the above-mentioned embodiments. It will be appreciated that the present invention will not be limited to the embodiments described above, but various modifications are possible without departing from the technical scope of the present invention. The position of the detected portion 59 formed on the receiving member 51 is one example and may be appropriately configured.

While, in the above embodiment, the seat device 10 for the front passenger seat has been described, not necessarily limiting to this, the seat device 10 is obviously applicable to other seats movable in the front-back direction of the vehicle such as a driver's seat, a second row seat, and a third row seat.

In the above embodiment, a case where, when the receiving member 51 of the power feeding member 50 doubles as the juxtaposed member, the detected portion 59 is disposed on the receiving member 51 (the juxtaposed member) while disposing the sensor 60 on the supporting portion 54 has been described. However, not necessarily limiting to this, the detected portion 59 can be obviously disposed on the supporting portion 54 while disposing the sensor 60 on the receiving member 51. Similarly to the above embodiment, in this case again, the power feeding member 50 can be used as the mechanism detecting the position of the seat 70, thus the assembly operability of the seat device 10 ensures being improved.

While, in the above embodiment, a case where the power feeding member 50 is used as the mechanism detecting the position of the seat 70 has been described, not necessarily limiting to this, the juxtaposed member extending in the front-back direction of the vehicle is obviously allowed to be disposed side by side with the rail 20 regardless of the power feeding member 50. In this case, the juxtaposed member is coupled to the floor 11 or the seat 70. In the case where the juxtaposed member is coupled to the floor 11, the juxtaposed member includes the detected portion 59 or the sensor 60. In the case where the juxtaposed member includes the detected portion 59, the seat 70 (or the member coupled to the seat 70) includes the sensor 60, thus the installation position of the sensor 60 is spatially less restricted compared with the case where the sensor 60 is disposed on the rail 20. In the case where the juxtaposed member includes the sensor 60, the seat 70 (or the member coupled to the seat 70) includes the detected portion 59, thus the installation position of the sensor 60 is spatially less restricted compared with the case where the sensor 60 is disposed on the rail 20.

In contrast, also in the case where the juxtaposed member is coupled to the seat 70, the juxtaposed member includes the detected portion 59 or the sensor 60. In the case where the juxtaposed member includes the detected portion 59, the floor 11 (or the member coupled to the floor 11) includes the sensor 60, thus the installation position of the sensor 60 is spatially less restricted compared with the case where the sensor 60 is disposed on the rail 20. In the case where the juxtaposed member includes the sensor 60, the floor 11 (or the member coupled to the floor 11) includes the detected portion 59, thus the installation position of the sensor 60 is spatially less restricted compared with the case where the sensor 60 is disposed on the rail 20.

While, in the above embodiment, a case where the sensor 60 is a limit switch that includes a head portion configured to transmit a force and a motion from outside to the switch has been described, not necessarily limiting to this, the sensor 60 having the other mechanism is obviously employable. As the sensor 60 having the other mechanism, sensors of a contact type and a non-contact type that uses magnetic and electrical variations to detect the detected portion 59 are included. As the detected portion 59 detected by the sensor 60, any material that magnetically and electrically influences the sensor 60 is included.

While the above embodiment employs the pressure sensor 71 and the heater 72 as the example of the electric component equipped in the seat 70, not necessarily limiting to this, the other electric component is obviously allowed to be equipped in the seat 70. As other electric components, for example, electrically operated type slides, reclining mechanisms, lumbar supports, side supports, thigh supports, high adjusters, side airbags, air conditioners are included.

The above embodiment has described a case (a manual slide mechanism) where the occupant presses down the lock lever 40 to cause the claw portion 42 to exit from the lock holes 25 and 38 so as to release the lock, and afterward, the sliding portion 30 (the seat 70) is slid in the front-back direction with respect to the rail 20. However, not necessarily limiting to this, a slide mechanism of an electrically operated type where the manual lock lever 40 operated by the occupant is omitted and an electric actuator is used to move the sliding portion 30 with respect to the rail 20 is obviously allowed to be employed.

The invention claimed is:

1. A seat device comprising:
   a rail disposed on a floor of a vehicle, the rail extending along a front-back direction of the vehicle;
   a seat movable in the front-back direction of the vehicle along the rail;
   a lock portion that fastens the seat unmovably to the rail;
   a juxtaposed member coupled to the floor or the seat, side by side with the rail, the juxtaposed member extending along the front-back direction of the vehicle;
   a detected portion disposed on a member or the juxtaposed member, the member relatively moving with respect to the floor or the seat to which the juxtaposed member is coupled, the member being on a side of the floor or a side of the seat; and
   a sensor that detects the position of the detected portion in the front-back direction of the vehicle, the sensor being disposed on any of the juxtaposed member and the member on the floor side or the seat side.

2. The seat device according to claim 1,
   wherein a plurality of the rails are disposed on both sides in a right-left direction of the seat at intervals to one another in a right-left direction of the vehicle, and
   the juxtaposed member is disposed between the plurality of the rails.

3. The seat device according to claim 1, further comprising:
   a receiving member disposed on the floor, the receiving member extending along the front-back direction of the vehicle;
   a power feeding wire installed on the receiving member, the power feeding wire having a first end coupled to a wire on the floor side so as to supply electric power to an electric component equipped in the seat; and
   a power feeding member that includes a supporting portion movable along the receiving member, the supporting portion fixing a second end side of the power feeding wire,
   wherein the supporting portion is coupled to the seat, and the juxtaposed member doubles as the receiving member,
   the detected portion is disposed on one of the supporting portion and the receiving member, and
   the sensor is disposed on the other of the supporting portion and the receiving member.

4. The seat device according to claim 3, wherein the detected portion is disposed on the receiving member, and the sensor is disposed on the supporting portion.

5. A seat device comprising:
   a plurality of rails disposed on a floor of a vehicle, the rails extending along a front-back direction of the vehicle;
   a seat movable in the front-back direction of the vehicle along the rails;
   a lock portion that fastens the seat unmovably to the rails;
   a juxtaposed member coupled to the floor, side by side with the rails, the juxtaposed member extending along the front-back direction of the vehicle;
   a plurality of detected portions disposed on the juxtaposed member at intervals in the front-back direction of the vehicle; and
   a sensor that detects the position of the detected portions in the front-back direction of the vehicle, the sensor being disposed on the member on the seat side,
   wherein the rails are disposed on both sides in a right-left direction of the seat at intervals to one another in a right-left direction of the vehicle, and
   the juxtaposed member is disposed between the rails.

6. The seat device according to claim 5,
   wherein the sensor is installed on the end surface of the member on the seat side.

7. The seat device according to claim 5, further comprising:
   a receiving member disposed on the floor, the receiving member extending along the front-back direction of the vehicle;
   a power feeding wire installed on the receiving member, the power feeding wire having a first end coupled to a wire on the floor side so as to supply electric power to an electric component equipped in the seat; and
   a power feeding member that includes a supporting portion movable along the receiving member, the supporting portion fixing a second end side of the power feeding wire,
   wherein the supporting portion is coupled to the seat, and the juxtaposed member consists of the receiving member, and
   the sensor is disposed on the supporting portion.

8. The seat device according to claim 7,
   wherein the sensor is installed on the end surface of the member on the supporting portion.

9. The seat device according to claim 8, wherein:
   the receiving member is formed in a plate shape,
   the detected portions project upward from the lower surface side, the sensor is a limit switch, and a height of the detected portions projecting from the receiving member is configured to be a height necessary for opening and closing the switch included in the sensor.

\* \* \* \* \*